United States Patent
Baker et al.

(10) Patent No.: US 6,826,412 B2
(45) Date of Patent: *Nov. 30, 2004

(54) RADIO COMMUNICATION SYSTEM

(75) Inventors: Matthew P. J. Baker, Canterbury (GB); Timothy J. Moulsley, Caterham (GB); Bernard Hunt, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/420,679

(22) Filed: Apr. 22, 2003

(65) Prior Publication Data

US 2003/0195012 A1 Oct. 16, 2003

Related U.S. Application Data

(63) Continuation of application No. 09/575,610, filed on May 22, 2000, now Pat. No. 6,556,838.

(30) Foreign Application Priority Data

| May 26, 1999 | (GB) | 9912289 |
| Jul. 2, 1999 | (GB) | 9915571 |
| May 9, 2000 | (GB) | 0011007 |

(51) Int. Cl.$^7$ .............................................. H04Q 7/20
(52) U.S. Cl. .................................. 455/522; 370/342
(58) Field of Search ................... 455/522, 69; 370/335, 370/342

(56) References Cited

U.S. PATENT DOCUMENTS 6,556,838 B1 * 4/2003 Baker et al. ................ 455/522

* cited by examiner

Primary Examiner—Lee Nguyen
(74) Attorney, Agent, or Firm—Kevin Simons

(57) ABSTRACT

In a radio communication system having a primary station and plurality of secondary stations, power of uplink and downlink channels between the primary station and a secondary station is controlled in a closed loop manner by each station transmitting power control commands to the other station. Responsive to these commands receiving station adjusts its output power in steps. By considering a plurality of received power control commands receiving station may emulate the ability to use power control step sizes other than those it directly implements, for example step sizes smaller than its minimum or intermediate between implemented step sizes. Performance can thereby be improved under certain channel conditions. In one embodiment when required power control step size is less than the minimum step size of the receiving station, that station processes a group of power control commands to determine whether to adjust its output power by its minimum step size.

12 Claims, 2 Drawing Sheets

RADIO COMMUNICATION SYSTEM

CROSS REFERENCE TO RELATED APPLICATIONS

This is a continuation of application Ser. No. 09/575,610, filed May 22, 2000, now U.S. Pat. No. 6,556,838.

FIELD OF INVENTION

The present invention relates to a radio communication system and further relates to primary and secondary stations for use in such a system and to a method of operating such a system. While the present specification describes a system with particular reference to the emerging Universal Mobile Telecommunication System (UMTS), it is to be understood that such techniques are equally applicable to use in other mobile radio systems.

BACKGROUND OF THE INVENTION

There are two basic types of communication required between a Base Station (BS) and a Mobile Station (MS) in a radio communication system. The first is user traffic, for example speech or packet data. The second is control information, required to set and monitor various parameters of the transmission channel to enable the BS and the MS to exchange the required user traffic.

In many communication systems one of the functions of the control information is to enable power control. Power control of signals transmitted to the BS from a MS is required so that the BS receives signals from different MS at approximately the same power level, while minimising the transmission power required by each MS. Power control of signals transmitted by the BS to a MS is required so that the MS receives signals from the BS with a low error rate while minimising transmission power, to reduce interference with other cells and radio systems. In a two-way radio communication system power control may be operated in a closed or open loop manner. In a closed loop system the MS determines the required changes in the power of transmissions from the BS and signals these changes to the BS, and vice versa. In an open loop system, which may be used in a TDD system, the MS measures the received signal from the BS and uses this measurement to determine the required changes in the MS transmission power.

An example of a combined time and frequency division multiple access system employing power control is the Global System for Mobile communication (GSM), where the transmission power of both BS and MS transmitters is controlled in steps of 2 dB. Similarly, implementation of power control in a system employing spread spectrum Code Division Multiple Access (CDMA) techniques is disclosed in U.S. Pat. No. 5,056,109.

In considering closed loop power control it can be shown that for any given channel conditions there is an optimum power control step size which minimises the required $E_b/N_0$ (energy per bit/noise density). When the channel changes very slowly the optimum step size can be less than 1 dB, since such values are sufficient to track changes in the channel while giving minimal tracking error. As the Doppler frequency increases, larger step sizes give better performance, with optimum values reaching more than 2 dB. However, as the Doppler frequency is further increased there comes a point where the latency (or update rate) of the power control loop becomes too great to track the channel properly and the optimum step size reduces again, perhaps to less than 0.5 dB. This is because the fast channel changes cannot be tracked so all that is needed is the ability to follow shadowing, which is typically a slow process.

Because the optimum power control step size can change dynamically it may improve performance if the BS determines an appropriate power control step size for use in uplink transmissions from MS to BS and downlink transmissions from BS to MS, and informs the MS accordingly. An example of a system which may use such a method is the UMTS Frequency Division Duplex (FDD) standard, where power control is important because of the use of CDMA techniques. Although improved performance can be obtained by having a small minimum step size, for example 0.25 dB, this will significantly increase the cost of a station. However, if a station does not have to implement the minimum step size then it may not be able to implement the requested step size.

A further problem may occur in a system in which implementation of some power control step sizes by a station is optional. For example, in a system operating according to the UMTS specification a BS may use a plurality of different power control step sizes when changing the downlink transmission power, for example the four step sizes 0.5 dB, 1 dB, 1.5 dB and 2 dB. However, it may be the case that only implementation of a 1 dB step size is mandatory. In some circumstances it may be desirable to ensure that different BSs behave in a similar way. For example, during soft handover, a MS engages in communication with a plurality of BSs (known as the "active set" of BSs) to determine to which BS, if any, it should transfer. It is therefore necessary to avoid the transmission power of the BSs in the active set from diverging significantly. This is best achieved if the BSs in the active set change their transmission power in similar ways, for example by using similar power step sizes in response to received power control commands.

If two BSs are in soft handover with a MS which is moving at a speed such that 1.5 dB step sizes are optimal, but only one of the BSs supports 1.5 dB steps, optimum power control of both BSs is not possible. The network has to choose between instructing the BSs to use different step sizes, so that the optimum step size can be used by the BS supporting it (with the risk that the transmit powers of the two BSs will diverge significantly), or instructing both BSs to use the same non-optimal step size (e.g. 1 dB or 2 dB) in order to avoid undue divergence of transmit power. Clearly, neither choice is optimal.

SUMMARY OF THE INVENTION

An object of the present invention is to enable selection of optimum power control step sizes without requiring all stations to implement the same set of step sizes.

According to a first aspect of the present invention there is provided a radio communication system having a communication channel between a primary station and a secondary station, one of the primary and secondary stations (the transmitting station) having means for transmitting power control commands to the other station (the receiving station) to instruct it to adjust its output transmission power, wherein the receiving station has emulation means for emulating an unsupported power control step size by a combination of power control steps of at least one supported size.

According to a second aspect of the present invention there is provided a primary station for use in a radio communication system having a communication channel between the primary station and a secondary station, the primary station having means for adjusting its output transmission power in steps in response to power control commands transmitted by the secondary station, wherein emulation means are provided for emulating an unsupported power control step size by a combination of power control steps of at least one supported size.

According to a third aspect of the present invention there is provided a secondary station for use in a radio communication system having a communication channel between the secondary station and a primary station, the secondary station having means for adjusting its output transmission power in steps in response to power control commands transmitted by the primary station, wherein emulation means are provided for emulating an unsupported power control step size by a combination of power control steps of at least one supported size.

According to a fourth aspect of the present invention there is provided a method of operating a radio communication system having a communication channel between the primary station and a secondary station, the method comprising one of the primary and secondary stations (the transmitting station) transmitting power control commands to the other station (the receiving station) to instruct it to adjust its power in steps, wherein the receiving station emulates an unsupported power control step size by a combination of power control steps of at least one supported size.

The present invention is based upon the recognition, not present in the prior art, that emulation of small power control step sizes by a station can provide good performance.

BRIEF DESCRIPTION OF DRAWINGS

Embodiments of the present invention will now be described, by way of example, with reference to the accompanying drawings, wherein.

DETAILED DESCRIPTION OF THE INVENTION

Figure 1:
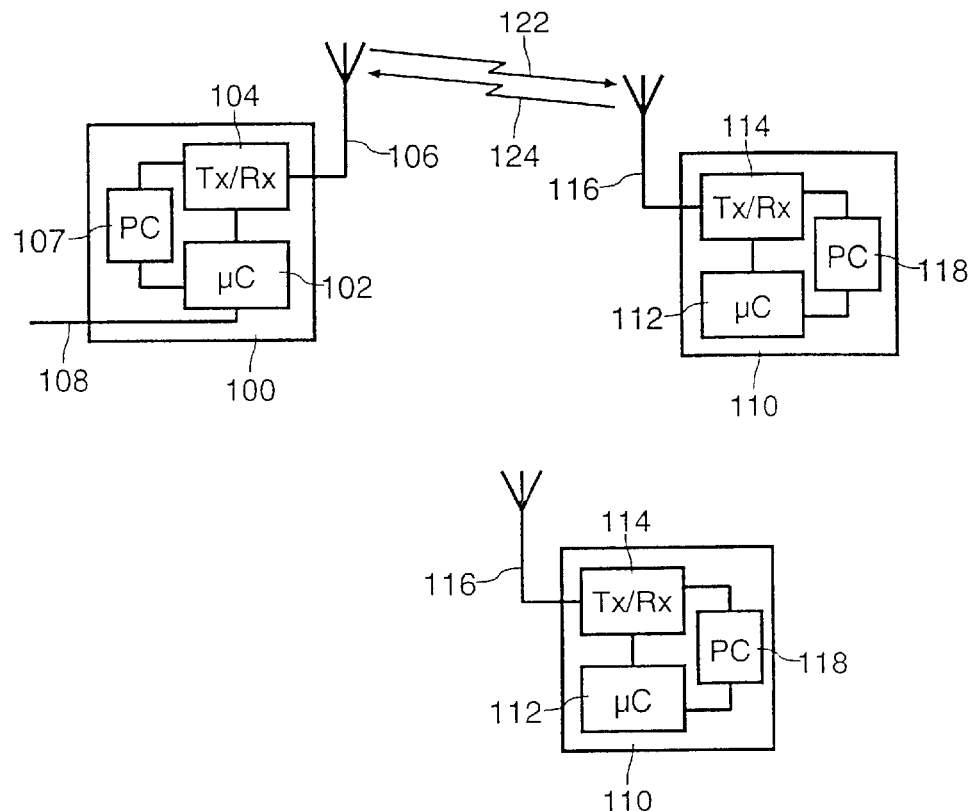
FIG. 1 is a block schematic diagram of a radio communication system.

Referring to FIG. 1, a radio communication system which can operate in a frequency division duplex or time division duplex mode comprises a primary station (BS) 100 and a plurality of secondary stations (MS) 110. The BS 100 comprises a microcontroller ($\mu C$) 102, transceiver means (Tx/Rx) 104 connected to radio transmission means 106, power control means (PC) 107 for altering the transmitted power level, and connection means 108 for connection to the PSTN or other suitable network. Each MS 110 comprises a microcontroller ($\mu C$) 112, transceiver means (Tx/Rx) 114 connected to radio transmission means 116, and power control means (PC) 118 for altering the transmitted power level. Communication from BS 100 to MS 110 takes place on a downlink channel 122, while communication from MS 110 to BS 100 takes place on an uplink channel 124.

In a UMTS FDD system data is transmitted in 10 ms frames each having 15 time slots. The BS 100 transmits one power control command (consisting of two bits) per slot, where bits 11 (referred to hereinafter for simplicity as a value of 1) requests the MS 110 to increase its power and bits 00 (referred to hereinafter as 0) requests the MS 110 to decrease its power. Changes in the required power control step size are notified separately over a control channel.

In a system according to the present invention this behaviour is modified when the MS 110 is requested to implement a power control step size smaller than the smallest of which it is capable. In this situation the MS 110 takes no action unless it receives a series of identical power control commands, thereby emulating the performance of a MS 110 having more precise power control.

Consider for example the case where the requested step size is 0.5 dB and the minimum step size implemented by the MS 110 is 1 dB. The MS 110 processes power control commands in pairs and only changes its output power if both commands are equal. Hence if the received commands are 11 the power is increased, if they are 00 the power is decreased, and if they are either 10 or 01 the power is not changed. It may be advantageous to align the comparison with the transmission of frames, hence to combine the power control commands transmitted in slots 1 and 2 of a particular frame, then the commands transmitted in slots 3 and 4, and so on.

Similarly, if the requested step size is 0.25 dB and the minimum step size is 1 dB the MS 110 processes power control commands four at a time, and only changes its output power if all four commands are equal. Hence the power is increased if the received commands are 1111, decreased if they are 0000, and unchanged otherwise. Again it may be advantageous to align the comparison with the frame transmission, combining the commands transmitted in slots 1 to 4 of a particular frame, then the commands transmitted in slots 5 to 8 and so on.

Combining the commands received in three or five slots is particularly advantageous in the UMTS embodiment being considered because it maintains alignment with a frame of 15 slots. However, the method is not restricted to such a system. Consider a general case where the minimum step size implemented by the MS 110 is S and the step size requested by the BS 100 is R. In this case the power control commands may be combined in groups of G, where G=S/R.

Figure 2:
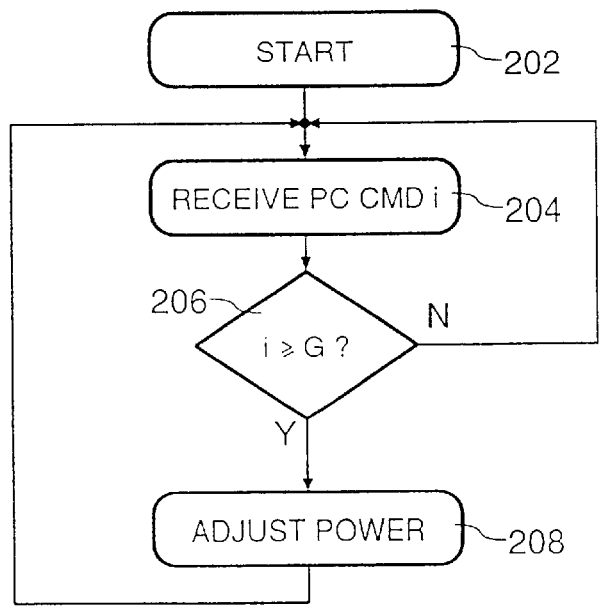
FIG. 2 is a flow chart illustrating a method in accordance with the present invention for performing power control in a secondary station.

FIG. 2 illustrates a method of emulating smaller power control steps than the minimum of the MS 110. The method starts, at 202, with the MS 110 determining G, the number of commands to be combined in a group and setting a received power control command counter i to zero. At 204 the MS 110 receives a power control command and increments the counter i. Next, at 206, the value of i is compared with G. If i is less than G then the received command is stored and the MS 110 waits to receive the next command. Otherwise the required number of power control commands have been received and the MS 110 determines, at 208, if it should adjust its power based on the received power control commands. Once this has been done the counter i is reset to zero (if i is equal to G) or to one (if i is greater than G, which will happen if G is not integer) and the MS 110 waits to receive the next power control command.

In an alternative embodiment, instead of combining power control commands in groups of G the MS 110 keeps a running total of the requested power change and makes a change once the total requested power change reaches its minimum step size. For example, if the requested step size is 0.25 dB and the minimum step size is 1 dB the sequence of received commands 11010111 would result in the power being increased by 1 dB. The MS 110 then subtracts the step actually implemented from the running total of the requested power change. However, such a scheme is more complex to implement (since it requires maintaining a running total of the requested power change) and it appears to provide only a minimal improvement to the performance of the method.

In a variation of this alternative embodiment, the MS 110 uses a soft decision method in keeping a running total of the requested power change, instead of taking a hard decision on each individual power control command. Each power control command is weighted by a function of the amplitude of the received signal for that command, as a measure of the likelihood of the MS 110 having correctly interpreted the command, before being added to the running sum. For example, the sequence 11010111011 might, once weighted, correspond to the sequence of requested power changes 0.8 0.3-0.3 0.4-0.1 0.5 0.9 0.8-0.4 0.7 0.5 (in units of 0.25 dB). This sequence has a running sum of 4.1 which would trigger the MS 110 to execute an upwards step of 1 dB and to reduce the running sum to 0.1. This variation should provide a slight improvement in the performance of the method.

Two simulations have been carried out to illustrate the effectiveness of the method according to the present invention. These examine the performance of a MS 110 having a minimum step size of 1 dB compared with that of a MS 110 having a minimum step size of 0.25 dB. The simulations make a number of idealising assumptions:

there is a 1 slot delay in the power control loop;
there is no channel coding;
there is perfect channel estimation by the receiver;
equalisation in the receiver is carried out by a perfect RAKE receiver;
no control channel overhead is included in the $E_b/N_0$ figures; there is a fixed error rate in the transmission of power control commands; and
the channel is modelled as a simple N-path Rayleigh channel.

Figure 3:
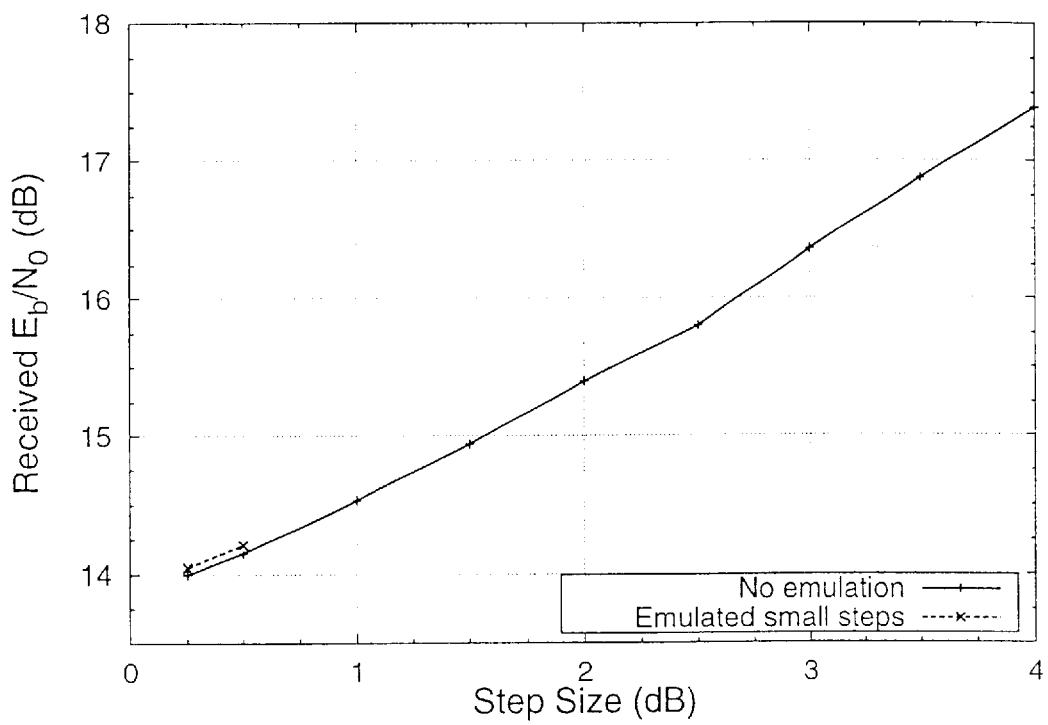
FIG. 3 is a graph of the received $E_b/N_0$ in dB required for a bit error rate of 0.01 against the power control step size used in dB for a MS moving at 300 km per hour.

The first simulation relates to a rapidly changing channel, with a MS 110 moving at 300 km per hour in a single path Rayleigh channel with an error rate for the power control commands of 0.01. FIG. 3 is a graph of the received $E_b/N_0$ in dB required for an uplink bit error rate of 0.01 against the power control step size used in dB. The solid line indicates results for a MS 110 having a minimum power control step size of 0.25 dB or less, while the dashed line indicates results for a MS 110 having a minimum step size of 1 dB which combines power control bits in groups of two or four to emulate 0.5 dB and 0.25 dB power control step sizes respectively.

In this situation the best performance is obtained for small step sizes of less than 1 dB. Emulation of 0.25 dB and 0.5 dB steps results in a small implementation loss of only about 0.05 dB, compared to about 0.6 dB if no emulation is performed, demonstrating the usefulness of the emulation method. Increasing the error rate of the power control commands to 0.1 produces a general degradation of about 0.2 dB in the received $E_b/N_0$, but the performance of the MS 110 with emulated small steps remains close to that of the MS 110 with direct implementation of small steps.

Figure 4:
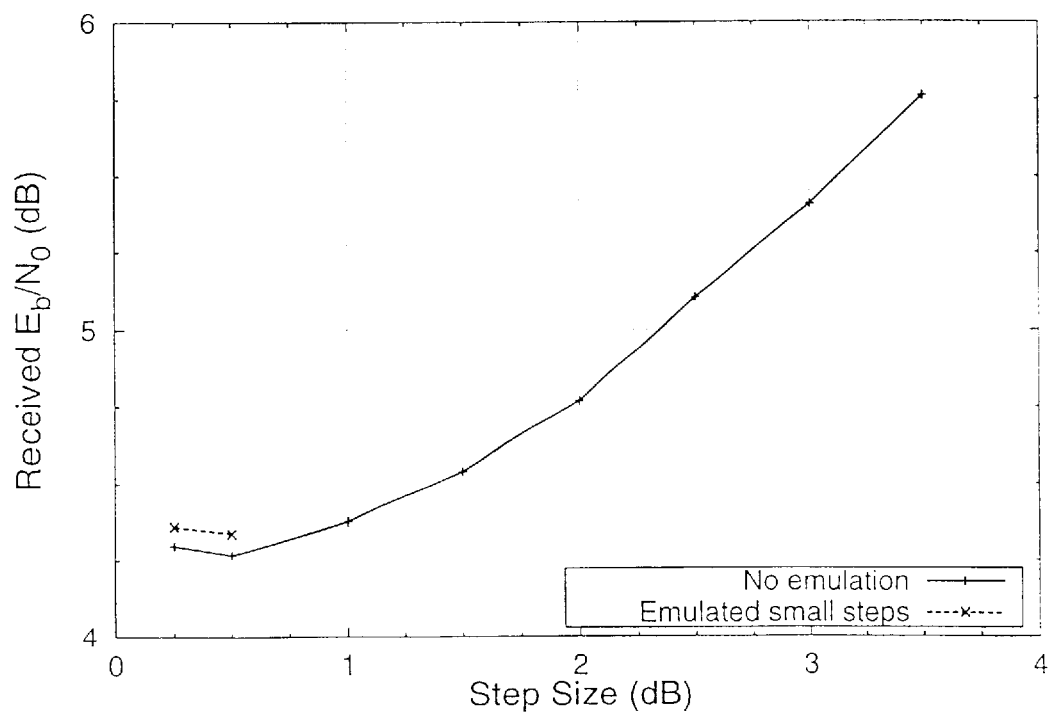
FIG. 4 is a graph of the received $E_b/N_0$ in dB required for a bit error rate of 0.01 against the power control step size used in dB for a MS moving at 1 km per hour.

The second simulation relates to a slowly changing channel, with a MS 110 moving at 1 km per hour in a six path Rayleigh channel with an error rate for the power control commands of 0.01. FIG. 4 is a graph of received $E_b/N_0$ in dB required for a uplink bit error rate of 0.01 against the power control step size used in dB. The lines in the graph are identified in the same way as for FIG. 3.

In this situation there is a small advantage in using power control steps of less than 1 dB. As with the first simulation, the results obtained using emulated small steps are very close to those with direct implementation of small steps.

In a further application of this method the value of G may be set to a value other than S/R if it is considered to be advantageous for reasons such as reducing the effect of errors in the interpretation of the transmitted power control commands (for example by averaging over a greater time period). In some circumstances a MS 110 might therefore choose to use a step size larger than the minimum which it is capable of implementing.

A variation of the method described above can be employed for the emulation of unsupported power control step sizes greater than the minimum step size implemented by a station. Consider the case of a BS 100 in a system operating according to the UMTS specification. In one example of such a system the BS 100 may use one of four step sizes when adjusting the power of the downlink transmission 122, namely 0.5 dB, 1 dB, 1.5 dB and 2 dB, of which only 1 dB is mandatory.

Consider the situation where the BS 100 is instructed by the network infrastructure to use 1.5 dB steps but only implements 1 dB and 2 dB steps. In a method in accordance with the present invention the BS 100 considers the received power control commands in pairs. For use during soft handover it is advantageous for these groups to be aligned to either an odd- or even-numbered frame boundary, since a frame includes an odd number (15) of timeslots. The definition of an even or odd frame can be determined from a connection frame number or system frame number. Such alignment ensures that different BSs 100 in the active set, which are executing an emulation algorithm in accordance with the present invention, behave in a similar way.

In the first timeslot of each pair the BS 100 always implements a power step of 1 dB in the direction given by the sign of the received power control command, where the sign is considered to be negative if the received command is 0 and positive if the received command is 1. In the second timeslot, the BS 100 implements a power step of 2 dB if the received power control command is of the same sign as that received in the first slot, or a power step of magnitude 1 dB if the signs are opposite. If a BS 100 only implements 1 dB steps, more than one 1 dB step could be performed in a single timeslot if a larger step size is required by the emulation algorithm. The resultant power changes are:

| commands | | power change | |
|---|---|---|---|
| 1st slot | 2nd slot | 1st slot | 2nd slot |
| 0 | 0 | −1dB | −2dB |
| 0 | 1 | −1dB | +1dB |
| 1 | 0 | +1dB | −1dB |
| 1 | 1 | +1dB | +2dB |

The above method can be generalised to handle the case of emulating step sizes equal to (x+0.5) dB where the BS 100 can implement steps of x dB and (x+1) dB by having the power step in the first timeslot of x dB and the power step in the second timeslot of x dB or (x+1)dB as appropriate.

Further generalisation is also possible. Consider the case of emulating step sizes equal to (x+a)Δ dB, where Δ is the smallest step size supported by the BS 100, x is an integer and 0<a<1. Each time that the BS 100 receives a power control command it performs the following calculation:

$$S_i = S_{i-1} + Pa$$

where P is equal to −1 when the received command has a value of 0 and is equal to +1 when the received command has a value of 1. $S_{i-1}$ is initialised to zero in the first timeslot, and thereafter is equal to the value of $S_i$ in the previous timeslot.

If $S_i \leq 0.5$, the size of the power step implemented by the BS 100 is xΔ dB. If $S_i > 0.5$, the size of the power step implemented by the BS 100 is (x+1)Δ dB, and the BS 100 subtracts P from $S_i$.

Now consider the case of emulating step sizes equal to (x+a/b)Δ dB, where x, a and b are integers and a<b. The BS 100 considers received power control commands in groups of b. For the soft handover case it is preferred that the groups are aligned to an odd- or even-numbered frame boundary, for the same reasons as given above for the basic emulation algorithm.

The BS 100 divides the group of b timeslots into a sub-groups, such that there is at most a difference of 1 in the number of timeslots in each subgroup. In all timeslots except the last one in each sub-group, the BS 100 always implements a power step of magnitude xΔ dB in the direction given by the sign of the received power control command in that slot. In the last slot of each sub-group, the BS 100 implements a power step of magnitude (x+1)Δ dB if the received power control commands in all slots of that sub-group are of the same sign, otherwise it implements a power step of magnitude xΔ dB. This method ensures that the error in power level is never greater than the greater of a/b dB and (1−a/b) dB.

The methods described above may also be further generalised to include the emulation of any step size intermediate between two step sizes supported by a BS 100 or MS 110.

In the description above, any reference to emulation of step sizes by a MS 110 for controlling the power of the uplink transmission 124 could equally well be employed by a BS 100 for controlling the power of the downlink transmission 122, and vice versa.

Further, the detailed description above relates to a system where power control commands are transmitted separately from instructions to a station to set its power control step size. However, the present invention is suited for use in a range of other systems. In particular, it can be used in any system in which there is a variable power control step size and in which a station is instructed to use a particular value for this step. It can also be used in systems in which the power control step size is fixed, or at least fixed while a power control step size emulation method is being used. The particular step size to be used by a station could be determined by the network infrastructure, the BS 100, or the MS 110. It could also be determined by negotiation between any of these entities.

From reading the present disclosure, other modifications will be apparent to persons skilled in the art. Such modifications may involve other features which are already known in radio communication systems, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
  a primary station and a secondary station, at least one of the primary station and the secondary station configured to transmit power control commands to the other station for controlling in a closed loop manner power transmitted over a communication channel between the primary station and the secondary station, the power control commands indicating a required power control step size that is not directly implemented in the station receiving the power control commands; and
  wherein the station receiving power control commands includes emulation means, responsive to the power control commands, for emulating the required power control step size by using a combination of power control steps of a size directly implemented in the receiving station.

2. The radio communication system of claim 1, wherein the required power control step size is less than the minimum step size directly implemented in the receiving station.

3. The radio communication system of claim 2, wherein the emulation means processes a group of power control commands to determine whether to adjust the receiving station's output power by the minimum step size directly implemented in the receiving station.

4. A primary station for use in a radio communication system having a communication channel between the primary station and a secondary station, the primary station comprising:
  means for receiving power control commands from the secondary station for controlling in a closed loop manner power transmitted by the primary station over the communication channel, the power control commands indicating a power control step size that is not directly implemented in the primary station;
  means for adjusting output power of the primary station in steps in response to the power control commands received from the secondary station; and
  wherein the means for adjusting includes emulation means for emulating the required power control step size by using a combination of power control steps of a size directly implemented in the primary station.

5. The primary station of claim 4, wherein the required power control step size is less than the minimum step size directly implemented in the primary station.

6. The primary station of claim 5, wherein the emulation means processes a group of power control commands to determine whether to adjust the primary station's output power by the minimum step size directly implemented in the primary station.

7. A secondary station for use in a radio communication system having a communication channel between the secondary station and a primary station, the secondary station comprising:
  means for receiving power control commands from the primary station for controlling in a closed loop manner power transmitted by the secondary station over the communication channel, the power control commands indicating a power control step size that is not directly implemented in the secondary station;
  means for adjusting output power of the secondary station in steps in response to power control commands received from the primary station; and
  wherein the means for adjusting includes emulation means for emulating the required power control step size by using a combination of power control steps of a size directly implemented in the secondary station.

8. The secondary station of claim 6, wherein the required power control step size is less than the minimum step size directly implemented in the secondary station.

9. The secondary station of claim 8, wherein the emulation means processes a group of power control commands to determine whether to adjust the secondary station's output power by the minimum step size directly implemented in the secondary station.

10. A method of operating a radio communication system having a communication channel between a primary station and a secondary station, the method comprising:
  at least one of the primary station and the secondary station transmitting power control commands to the other station for controlling in a closed loop manner power transmitted over the communication channel, the power control commands indicating a required power control step size that is not directly implemented in the station receiving the power control commands;
  the station receiving the power control commands adjusting its output power in steps in response to receipt of the power control commands; and wherein
  the station receiving the power control commands adjusts its output power by emulating the required power control step size using a combination of power control steps of a size directly implemented in the receiving station.

11. The method of claim 9, wherein the required power control step size is less than the minimum step size directly implemented in the receiving station.

12. The method of claim 11, wherein the station receiving the power control commands emulates the required power control step size by processing a group of power control commands to determine whether to adjust the receiving station's output power by the minimum step size directly implemented in the receiving station.

* * * * *